Oct. 7, 1958
M. E. WEBSTER
2,854,991
PRESSURE REGULATOR VALVE
Filed Nov. 1, 1955
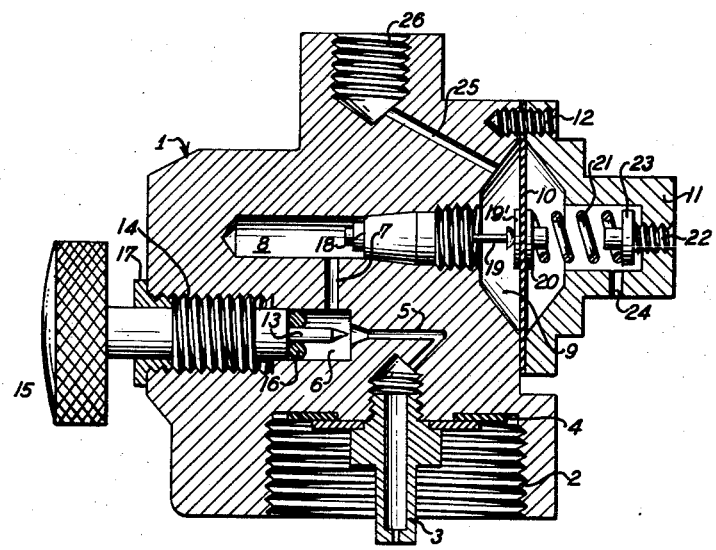
INVENTOR
MILO E. WEBSTER
BY *Burgess, Dinklage & Sprung*
ATTORNEY United States Patent Office 2,854,991
Patented Oct. 7, 1958

2,854,991

PRESSURE REGULATOR VALVE

Milo E. Webster, Rochester, N. Y., assignor to Otto Bernz Co., Inc., Rochester, N. Y.

Application November 1, 1955, Serial No. 544,203

2 Claims. (Cl. 137—322)

This invention relates to new and useful improvements in pressure regulator valves. The invention more particularly relates to a pressure regulator valve for connecting a gas appliance to a gas supply tank, as for example, a portable tank.

Recently a number of gas appliances, as for example, torches, stoves, lanterns and the like which operate off a small, portable throwaway cylinder of liquified propane gas have become widely used and commercially available. The gas appliance is generally attached and disconnected from the cylinder by means of a tap connection which has an elongated hollow stem which, when in position, opens a check valve such as a tire valve which normally seals the cylinder. The tap connection is additionally generally provided with an adjustable control valve, such as a needle valve, to control the rate of flow of gas from the cylinder and to shut off the gas supply when desired. It is also necessary to substantially reduce the pressure of gas as the same passes out of the cylinder to the gas appliance and to aid in the vaporization in connection with liquified fuel.

For this purpose, the tap connections have been provided with filters and restrictions which would effect a pressure reduction of gas leaving the cylinder and aid in the vaporization. These filters and restrictions, however, do not prove satisfactory in providing an even flow of gas to the gas appliance for any given setting of the adjustable needle valve irrespective of the position of the cylinder or operating conditions. With the restrictions and filters the operating characteristics of the appliance would widely change depending upon the position of the cylinder and operating temperature. Very often liquid particles fuel would be passed to the appliance without complete vaporization causing an erratic flame and often extinguishment of the flame.

In my co-pending application Serial No. 438,400 filed June 22, 1954, now Patent Number 2,793,504, a regulator structure is disclosed which overcomes many of the disadvantages of the restrictions and/or filters. This regulator basically consists of a spring-loaded check valve which is normally biased to the closed position, but which will be opened against the spring force by the gas pressure. This pressure regulator, however, has a disadvantage common with previous restrictions and filters of not being able to compensate changes in pressure of the fuel in the cylinder, as for example, caused by changes in temperature. In connection with liquified gases, the cylinder pressure is the vapor pressure of the liquid which is, of course, dependent upon the temperature. With a setting of the regulator valve for optimum operation at the average temperature the regulator often ceased to function or allow necessary quantities of gas to pass therethrough when the appliance is initially started at a relatively lower temperature at which the vapor pressure liquified fuel is substantially decreased. Thus, for example when operating outdoors in winter weather the temperature of the cylinder and the liquified fuel gases may be so lowered that the vapor pressure is not sufficient to open the regulator valve against the spring force to allow a lighting of the appliance.

One object of this invention is a pressure regulator valve which is particularly adapted for use with portable liquified gas cylinders of the type described above without the abovementioned disadvantages.

A further object of this invention is a pressure regulator valve of very simple and economic construction but extremely reliable in operation which may be used in connection with any pressurized gas source. These and still further objects will become apparent when the following description read in conjunction with the drawing which diagrammatically shows a vertical cross-section of an embodiment of the regulator in accordance with the invention.

The pressure regulator, in accordance with the invention, has a housing defining a gas inlet, a gas outlet, and a diaphragm chamber having a movable, such as a flexible diaphragm sealing the same. The housing further defines a first gas flow passage connecting the inlet to the diaphragm chamber and a second gas flow passage connecting the outlet with the diaphragm chamber.

A check valve is positioned in the first gas flow passage with means normally biasing the same to an open position and means are provided connecting the diaphragm with the check valve for moving the check valve toward its closed position upon movement of the diaphragm caused by pressure increase in the diaphragm chamber.

The check valve is preferably a standard tire core valve positioned with its stem extending in to the diaphragm chamber in contact with the diaphragm which is resiliently urged by a spring to normally hold the tire valve in its open position.

Referring to the embodiment shown in the drawing, the housing 1 which may be constructed of a suitable metal, for example, brass aluminum or the like has its lower portion formed as a tap connection for a pressurized fuel cylinder such as a liquified propane cylinder of the portable, throwaway type. A female screw thread 2 tapped in the lower portion of the housing is dimensioned to screw over the male threaded bung type connection of the cylinder. An elongated hollow stem forming the inlet into the housing extends axially through the central portion of the cylindrical opening defined by the thread 2. This hollow stem is adapted to extend into the central opening of the bung connection of the cylinder as the thread 2 screwed into position. The stem contacts and opens a check valve such as a standard tire core valve in the cylinder and effects a gas tight seal through an O-ring provided in the cylinder until the rubber gasket 4 can be screwed firmly against the bung further aiding the seal. A gas flow passage 5, 6, 7 and 8 connects the inlet formed by the hollow stem 3 with a diaphragm chamber 9. The diaphragm chamber 9 is sealed by a flexible diaphragm 10 of, for example, rubber, rubberized fabric, flexible metal, etc. The diaphragm 10 is sealed in place by means of a cover member 11, which is screwed by the screws 12 into the housing 1, pressing the diaphragm 10 between it and the housing forming a gas tight seal closing the chamber 9.

The portion of gas flow passage 6 is formed as a chamber for the adjustable needle valve 13 which is screwed into the housing by screw connection 14. The end of the needle valve 14 is formed as a thumb screw 15. The needle valve, by a suitable screw adjustment through the thumb screw 15, may seal a portion of the gas flow passage 5 or regulate the size of the opening between it and the portion 6. A rubber O-ring 16 prevents the escape of gas from the portion of the gas flow passage 6 to the outside along the needle valve stem. A sleeve 17 prevents the inadvertent screwing of the needle valve completely out of the housing and provides a positive stop in the maximum open position.

A check valve 18 in the form of a standard automobile tire core valve is positioned in the portion of the gas flow passage 8 leading into the diaphragm chamber 9. The tire core valve is screwed into the passage 8 in the same manner as the tire core valve is screwed into an automobile tire. The stem 19 of the tire core valve extends into the diaphragm chamber 9 and contacts the diaphragm 10. The contacting is actually effected through a small metal disk 19' connected to the diaphragm which prevents wear due to the contacts and provides a firmer support for the contact. The disk 19' may, however, be considered a part of the diaphragm. This type of contacting will be referred to herein and in the claims as contacting of the stem and diaphragm. On the other side of the diaphragm is a corresponding metal disk 20 which the coil spring 21 presses against. Tension of the coil spring 21 may be adjusted by means of the set screw 22 which presses against an end plate 23 which holds the spring. The tension of the spring should be so set that under normal conditions with no unbalanced gas pressures on the diaphragm 10 the same by means of the biasing force of the spring 21 will press the stem 19 of the tire valve so that the tire valve is maintained in its open position. A hole 24 extends through the cover 11 so that there is always normal pressure on the surface of the diaphragm chamber 9. A second gas flow passage 25 connects the diaphragm chamber 9 to the outlet connection 26 to which any standard gas burning appliance may be connected.

In operation a gas burning appliance such as a stove, torch lantern, or preferably a cooking device in which the gas passed through and burnt in a porous ceramic block is connected by means of a standard connection to the outlet 26. The inlet of the regulator is then connected to a gaseous fuel supply. In the embodiment shown the connection is effected by screwing the regulator onto a liquified propane gas cylinder of the portable throw away type. The screw threads 2 are screwed over the male connection threads of the cylinder and the stem 3 extends into the outlet opening of the cylinder forming a gas seal with the O-ring positioned in the cylinder outlet, and depressing the stem of the tire valve positioned in the cylinder, forming a gas connection between the interior of the stem and the interior of the cylinder. The cylinder when screwed down tight effects a further gas tight seal with the gasket 4. The needle valve 13 may be screwed to its closed position sealing the gas flow passage 5 so that no gas can pass out of the cylinder past this point.

When the needle valve 13 is opened by a suitable adjustment of the thumb screw 15 the gas flows through the gas flow passage 5, 6, 7, 8 through the tire valve 18 normally held in an open position into the diaphragm chamber 9, from the diaphragm chamber 9 through the second gas flow passage 25 to the outlet 26 through the tubing connecting the gas appliance.

The gas pressure is automatically regulated by the degree of opening of the tire valve 18 which is controlled by the pressure in the diaphragm chamber 9 acting on the diaphragm 10. If the pressure exceeds the desired amount as is set by the tension of the spring 21 through the set screw 22, the diaphragm will be forced outward pressing spring 21 and thus closing the tire valve 18 a given amount reducing pressure in the diaphragm chamber gas flow passage 25 and outlet 26. Conversely, if the pressure is too low, the spring 20 will push the diaphragm 10 and the stem 19 of the tire valve to further open the tire valve increasing pressure. A constant quantity of gas will flow through the regulator at a constant pressure irrespective of variations in the gas pressure in the cylinder caused, for example, by changes in temperature or position of the cylinder.

When, for example, the regulator is initially used in cold weather outdoors with a cold cylinder, and due to the temperature the pressure is relatively low, the tire valve 18 will be open near or at its maximum amount allowing an adequate supply of gas. After operation for a period of time when the cylinder heats up, the tire valve 18 will gradually close maintaining a constant pressure and flow rate.

The needle valve 13 is normally only used as a shut-off valve and in operation should be opened a sufficient amount so that the entire regulation is effected by the tire core valve. It is, however, possible in certain instances to use the needle valve 13 as an additional regulating valve in which connection the flow of gas into the device may be further reduced below the value normally pre-set by adjustment of the tire core valve 18 through the spring 21 and set screw 22.

As may be noted, the needle i. e. shut-off valve 13 is positioned in the gas passage between the valve 18 and the inlet 3 so that upon closure of the valve 13, it is not possible to lock pressure in the diaphragm chamber 9.

The regulator in accordance with the invention allows the use of a check valve such as a standard tire core valve as the metering device thus allowing very simple, inexpensive yet fool-proof construction.

Furthermore, the regulator in accordance with the invention has a manually operable shut-off and regulating valve which is highly advantageous in many applications as for example, in connection with use with a mantle type gas lantern.

In order to facilitate the description and understanding of the invention, the regulator shown in the drawings has been diagrammatically shown with all its parts including the inlet, outlet gas flow passages, check valve, diaphragm etc. in a common vertical plane.

In actual construction, however, it may be advantageous to differently position these component parts. Thus, for example, with the regulator so positioned that the stem 3 extends vertically downwards the axes of the needle valve, check valve and outlet may be positioned horizontally with about a 120 degree angle with respect to each other. The needle valve and outlet may be positioned in a common horizontal plane positioned above the inlet and the tire valve in the central portion of the diaphragm chamber may be positioned in a somewhat higher plane.

While the invention has been described in detail with reference to the specific embodiments shown many variations and modifications will become apparent to the skilled artisan which fall within the spirit of the invention and scope of the appended claims.

I claim:
1. Pressure regulator comprising a housing defining a tap connection for an LP fuel cylinder having an elongated hollow stem forming a gas inlet and defining a pressure contact for opening actuation of the closure valve on an LP cylinder, a gas outlet, a diaphragm chamber, a first gas flow passage connecting said inlet to said diaphragm chamber and a second gas flow passage connecting said outlet to said diaphragm chamber, an integral flexible diaphragm sealing said diaphragm chamber, an automobile tire valve positioned in said first flow passage with its stem extending into said diaphragm chamber in contact with said diaphragm, spring means biasing said diaphragm toward said tire core valve to normally maintain said valve in its open position, and adjustable shut-off valve means positioned in first gas flow passage between said inlet and said tire core valve.

2. Pressure regulator according to claim 1 in which said adjustable shut-off valve means is a needle valve.

References Cited in the file of this patent

UNITED STATES PATENTS

| | | |
|---|---|---|
| 322,410 | Baumeister | July 21, 1885 |
| 1,660,842 | Hoesel | Feb. 28, 1928 |
| 1,957,972 | Mills | May 8, 1934 |
| 1,856,505 | Persson | May 3, 1932 |
| 2,615,287 | Senesky | Oct. 28, 1952 |